United States Patent [19]
Yoshida et al.

[11] Patent Number: 5,220,523
[45] Date of Patent: Jun. 15, 1993

[54] WAVE FORM SIGNAL GENERATING APPARATUS

[75] Inventors: Kiyoshi Yoshida; Toshiro Inoue; Kiyoshi Hagino, all of Hamamatsu, Japan

[73] Assignee: Yamaha Corporation, Hamamatsu, Japan

[21] Appl. No.: 671,356

[22] Filed: Mar. 19, 1991

[30] Foreign Application Priority Data

Mar. 19, 1990 [JP] Japan .................................. 2-69261

[51] Int. Cl.⁵ ........................... G06F 1/02; G10H 7/00
[52] U.S. Cl. ........................................ 364/718; 84/604
[58] Field of Search .................. 364/718, 748; 84/604

[56] References Cited

U.S. PATENT DOCUMENTS

| | | | |
|---|---|---|---|
| 4,342,245 | 8/1982 | Gross | 364/718 X |
| 4,672,875 | 6/1987 | Suzuki | 84/604 |
| 4,809,577 | 3/1989 | Fujita | 364/718 X |
| 4,878,194 | 10/1989 | Nakatsugawa et al. | 364/718 X |
| 4,922,537 | 5/1990 | Frederiksen | 381/31 |

FOREIGN PATENT DOCUMENTS 60-63593  4/1985  Japan .

Primary Examiner—Tan V. Mai
Attorney, Agent, or Firm—Graham & James

[57] ABSTRACT

In a wave form signal generating apparatus designed to memorize a desired wave form in the form of a floating point representation for generating a wave form signal based on the memorized wave form, a mantissa and an exponent of a sampling data of the desired wave form are memorized in a predetermined number of digits as a compressed information, and a digit number of the memorized exponent allotted in the predetermined number of digits are further momorized. The memorized exponent is extracted on a basis of the memorized digit number so that the wave form signal is reproduced on a basis of the extracted exponent and the mantissa allotted in the remaining portion of the predetermined number of digits.

7 Claims, 8 Drawing Sheets

| EXPONENT | FIXED POINT PART |

| / | / | SM | EW1 | EW0 | DR2 | DR1 | DR0 |

Fig. 7

| SM | SHIFT MODE |
|---|---|
| 0 | NORMAL SHIFT MODE |
| 1 | TWICE SHIFT MODE |

Fig. 8

| EW | VARIATION RANGE OF DIFFERENTIAL DATA | BIT NUMBER IN LINEAR |
|---|---|---|
| 0 | -128 ~ +127 | 8 |
| 1 | -128 ~ +126 | 8 |
| 2 | -256 ~ +248 | 9 |
| 3 | -2048 ~ +1920 | 12 |

| EW | VARIATION RANGE OF DIFFERENTIAL DATA | BIT NUMBER IN LINEAR |
|---|---|---|
| 0 | -128 ~ +127 | 8 |
| 1 | -256 ~ +252 | 9 |
| 2 | -2048 ~ +1984 | 12 |
| 3 | -262144 ~ +245760 | 19 |

( SM=1 )

| DR | VARIATION RANGE OF DIFFERENTIAL DATA | RESOLUTION POWER | BIT NUMBER IN LINEAR | BIT SHIFT AMOUNT |
|---|---|---|---|---|
| 0 | -256 ~ +254 | 2 | 15 | 1 |
| 1 | -512 ~ +508 | 4 | 14 | 2 |
| 2 | -1024 ~ +1016 | 8 | 13 | 3 |
| 3 | -2048 ~ +2032 | 16 | 12 | 4 |
| 4 | -4092 ~ +4064 | 32 | 11 | 5 |
| 5 | -8192 ~ +8128 | 64 | 10 | 6 |
| 6 | -16384 ~ +16256 | 128 | 9 | 7 |
| 7 | -32768 ~ +32512 | 256 | 8 | 8 |

SHIFT BY DR

WAVE FORM SIGNAL GENERATING APPARATUS

BACKGROUND OF THE INVENTION

1. Field of the Invention

The present invention relates to a wave form signal generating apparatus designed to memorize a wave form data in the form of a floating point representation for reproducing a desired musical tone based on the memorized wave form data.

2. Description of the Prior Art

Disclosed in Japanese Patent Early Publication No. 60-63593 is a wave form signal generating apparatus of this kind in which a plurality of sampling data of a desired wave form are memorized in the form of a floating point representation consisting of a mantissa and an exponent. In such a prior art wave form signal generating apparatus, the memory capacity can be reduced since the mantissa and exponent of the sampling data are memorized as a compressed information. The digit numbers of the mantissa and exponent each are, however, fixed. For this reason, the high digit of the exponent would become useless for a small sampling data if the digit number of the exponent were increased to expand a dynamic range of the sampling data. In case the digit number of the mantissa were increased to minimize an error in reproduction of the desired musical tone, the dynamic range of the sampling data would be reduced.

SUMMARY OF THE INVENTION

It is, therefore, a primary object of the present invention to provide an improved wave form signal generating apparatus capable of minimizing an error in reproduction of the desired musical tone without causing any reduction of the dynamic range of sampling data.

According to the present invention, the primary object is attained by providing a wave form signal generating apparatus designed to memorize a desired wave form in the form of a floating point representation for generating a wave form signal based on the memorized wave form, which includes an address signal generator for generating an address signal in accordance with an input data applied thereto, memory means for memorizing a mantissa and an exponent of a sampling data of the desired wave form in a predetermined number of digits as a compressed information and wave form signal generating means for reading out the memorized mantissa and exponent of the sampling data in response to the address signal from the address signal generator and for generating a wave form signal based on the memorized mantissa and exponent of the sampling data. In the wave form signal generating apparatus, the memory means further comprises a digit number memory for memorizing a digit number information indicative of a digit number of the memorized exponent of the sampling data allotted in the predetermined number of digits, and the wave form signal generating means comprises extraction means for extracting the memorized exponent based on the digit number information and wave form reproduction means for reproducing the wave form signal based on the extracted exponent and the mantissa allotted in the remaining portion of the predetermined number of digits.

BRIEF DESCRIPTION OF THE DRAWINGS

Other objects, features and advantages of the present invention will be more readily appreciated from the following detailed description of a preferred embodiment thereof when taken together with the accompanying drawings, in which:

FIG. 7 is a table showing a content of a shift mode SM;

FIG. 8 is a table showing a variation range of a sampling data in a normal shift mode;

FIG. 9 is a table showing a variation range of a sampling data in a twice shift mode;

DESCRIPTION OF THE PREFERRED EMBODIMENT

Figure 1:
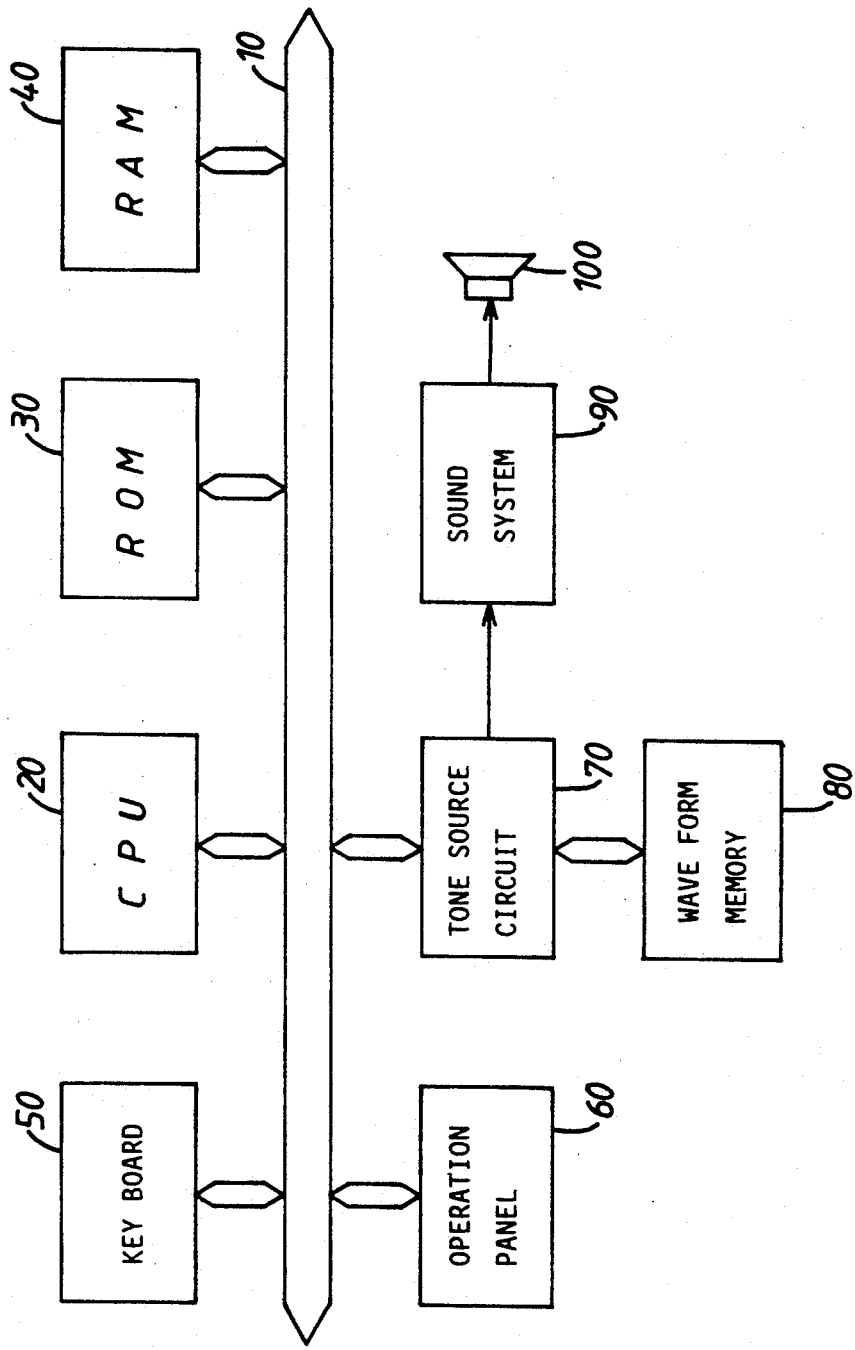
FIG. 1 is a schematic illustration of an electronic musical interument to which is adapted a wave form signal generating apparatus in accordance with the present invention.

In FIG. 1 of the drawings, there is diagrammatically illustrated an electronic musical instrument provided with a wave form signal generating apparatus according to the present invention. The musical instrument is arranged to generate a musical tone under control of a central processing unit or CPU 20 connected to a bus line 10. The CPU 20 is designed to execute a program memorized in a read only memory or ROM 30 by using variables temporarily memorized in a random access memory or RAM 40. The musical instrument has a key board 50 and an operation panel 60 which are connected to the CPU 20 through the bus line 10. The CPU 20 is responsive to operation of the key board 50 and operation panel 60 to produce a key code signal KC indicative of a depressed key on the key board 50 and a key-on signal KON indicative of the depressed condition of the key and to produce a tone-color signal indicative of a tone-color selected by operation of the operation panel 60. A tone source circuit 70 is connected to the bus line 10 to be applied with the key code signal KC, the key-on signal KON and the tone-color signal from the CPU 20 for producing a musical tone signal in accordance with an operated condition of the key board 50 and operation panel 60. The tone source circuit 70 is connected to a wave form memory 80 to be applied with a memorized musical wave form therefrom for producing a musical tone wave form signal. A speaker 100 is connected to the tone source circuit 70 through a sound system 90 to reproduce a musical tone in response to the musical tone wave form signal.

Figure 2:
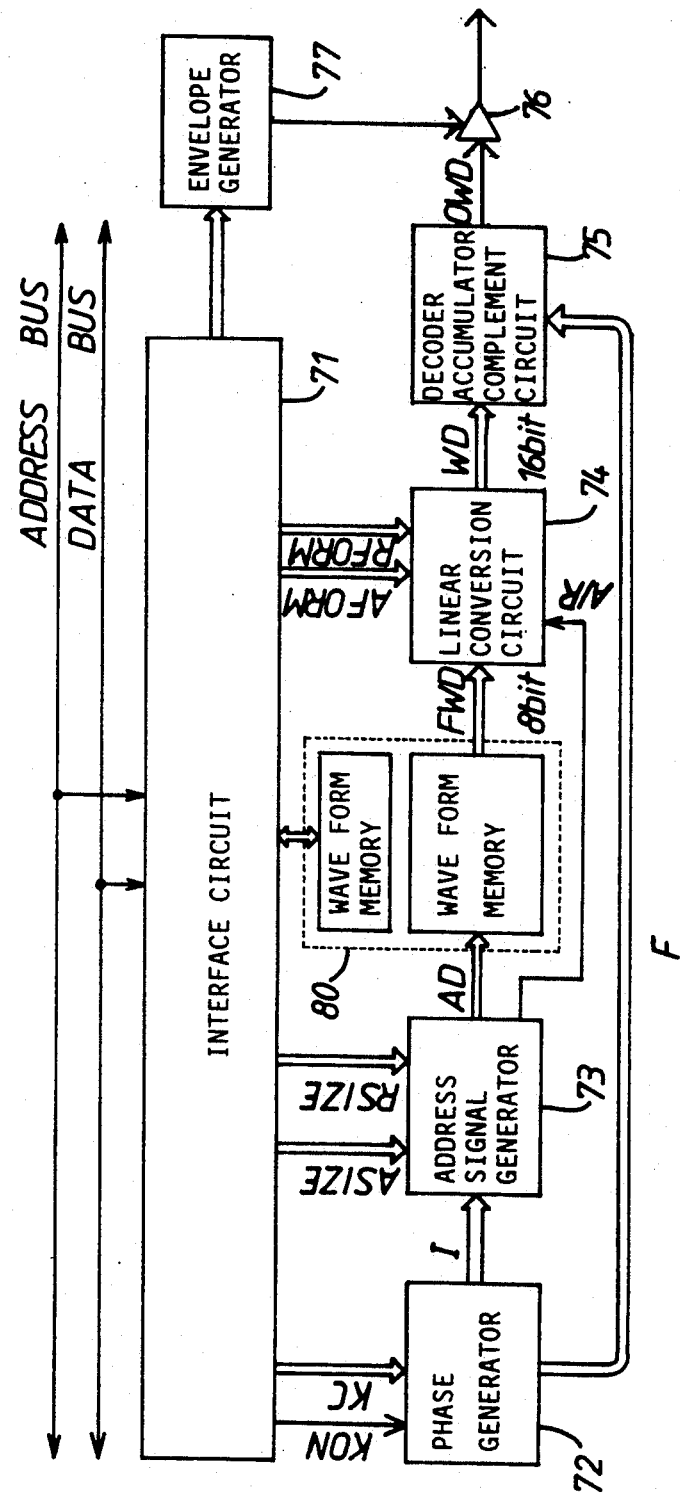
FIG. 2 is a schematic illustration of a tone source circuit and a wave form memory.

As shown in FIG. 2, the tone source circuit 70 has an interface circuit 71 connected to the bus line 10 to temporarily memorize an input signal data applied thereto from the bus line 10 and to apply an output signal to the bus line 10. The interface circuit 71 is connected to a phase generator 72 which is designed to accumulate therein a phase amount per a unit time corresponding with the key code signal KC and to issue an integral part I and a fractional part F of the accumulate phase amount. An address signal generator 73 is arranged to be applied with the integral part I from the phase generator 72 for generating an address signal AD indicative of an address value corresponding with a phase value represented by the integral part I. The wave form memory 80 is arranged to be applied with the address signal AD.

Figure 3:
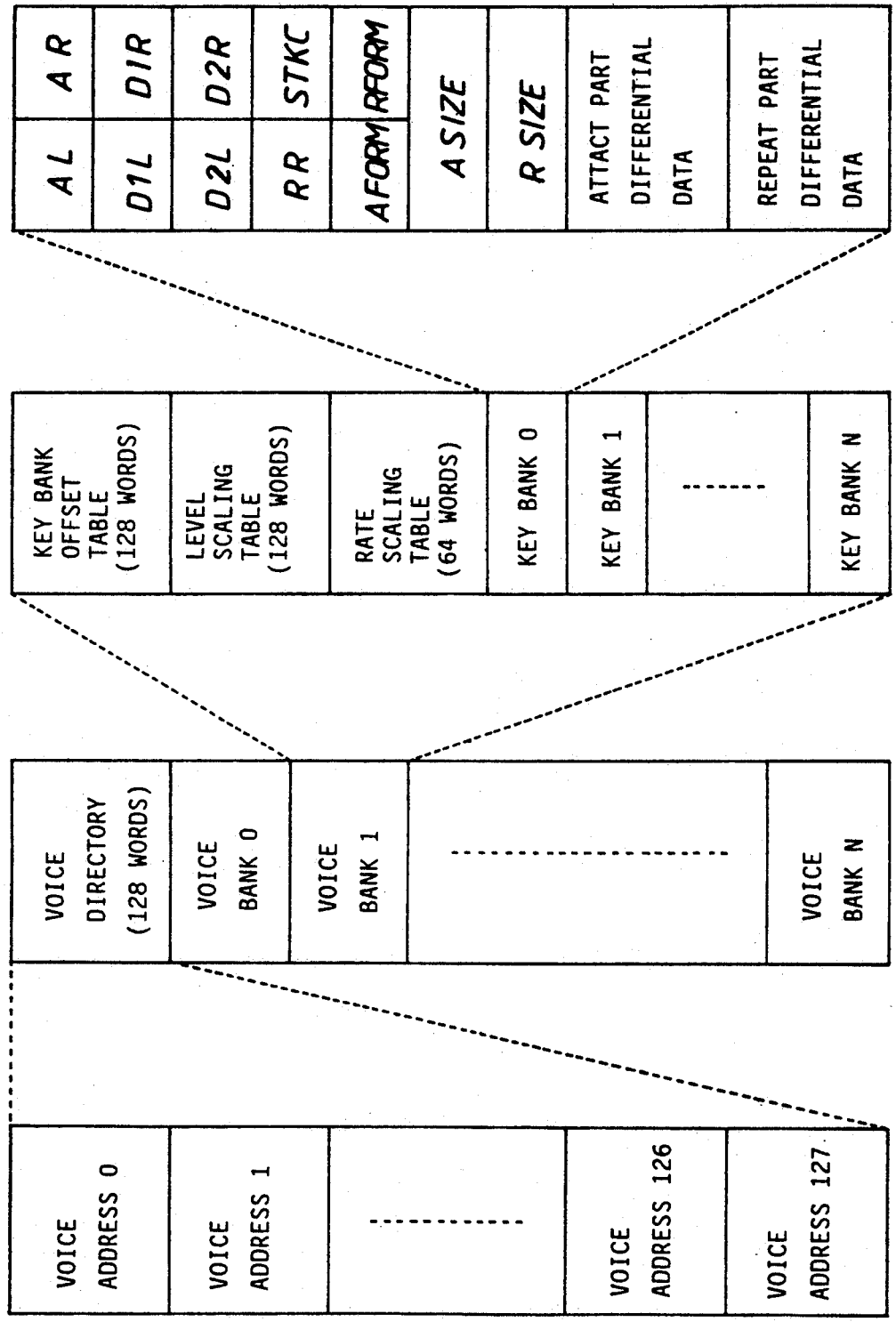
FIG. 3 illustrates a memory map of the wave form memory.

In FIG. 3 there is illustrated a memory allotment in the wave form memory 80. The memory area of the wave form memory 80 is allotted with a voice directory of 128 words at its initial part and allotted with voice banks (1-N) corresponding with respective tone colors in its remaining parts. Memorized in the voice directory are start addresses (0-127) of the voice banks corresponding with the respective tone colors. The banks (1-N) each are provided with key banks (0-N) and provided with a key bank offset table for memorizing offset data of the respective key banks (0-N), a level scaling table for memorizing a scaling data of an amplitude width value determined in accordance with respective key codes and a rate scaling table for memorizing a scaling data related to a variation rate of an amplitude width value of the wave form determined in accordance with each of the two key codes. The key banks 0-N each are adapted to memorize as a wave form data a differential data of an attack part read out only once immediately after depression of a key, a differential data of a repeat part repeatedly read out after reading out the differential data of the attack portion and a predetermined parameter related to both the differential data. Memorized as the predetermined parameter are an attack level AL, an attack rate AR, a first decay level D1L, a first decay rate D1R, a second decay level D2L, a second decay rate D2R and a key-off rate RR for reappearance of a wave form envelope (see FIG. 4), a scaling standard key code STKC indicative of a key code corresponding with the wave form data in scaling, an attack part format AFORM and a repeat part format RFORM indicative of a compressed information of the wave form and a differential data number ASIZE of the attack part and a differential data number RSIZE of the repeat part.

Figures 4, 5, 6:
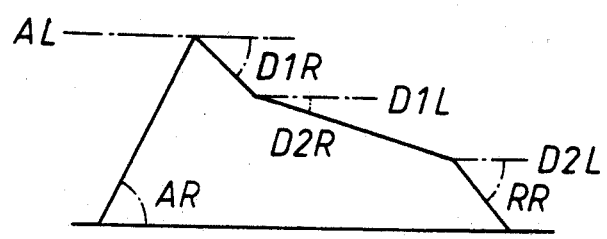
FIG. 4 is a view showing parameters related to an envelope.
FIG. 5 illustrates a mantissa and an exponent of a differential data.
FIG. 6 illustrates a format of a compressed information.

When applied with the differential data number ASIZE of the attack part and the differential data number RSIZE of the repeat part from the wave form memory 80 through the interface circuit 71, the address signal generator 73 produces an address signal AD indicative of an address value for a predetermined range defined in accordance with the differential data numbers ASIZE and RSIZE and produces a discrimination signal A/R representing the fact that the differential data of the attack part or the repeat part is read out therefrom. The differential data each are composed of 8 bits in which the high bits represent an exponent while the lower bits represent a mantissa as shown in FIG. 5. The exponent part is composed of 3 bits in a maximum. At the attack part causing an excited variation of the wave form, the bit number of the exponent part is made large for reappearance of a steep variation of the wave form. At the repeat part causing a relatively moderate variation of the wave form, the bit number of the exponent part is made small, and the bit number of the mantissa is made large to enhance a resolution power. As shown in FIG. 6, the attack part format AFORM and repeat part format RFORM each are also composed of 8 bits in which the higher two bits are adapted as spare bits, one bit is adapted for a shift mode SM indicative of the exponent part mode, two bits are adapted for an exponent width E indicative of the digit number of the exponent and the remaining three bits are adapted for a shift amount DR indicative of the shift amount of the exponent.

Figures 10, 11:
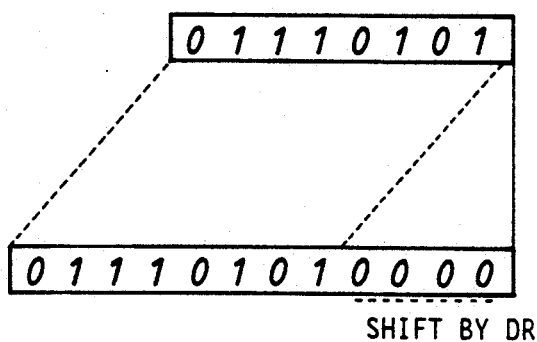
FIG. 10 is a table showing a variation range of a shift amount DR and a sampling data.
FIG. 11 illustrates a sampling data shifted by a shift amount DR.

When the shift mode SM is "0", the exponent is conditioned in a normal shift mode as shown in FIG. 7. When the exponent width EW becomes "0"-"3", a variation extent of the differential data becomes as shown in FIG. 8. When the shift mode SM is "1", the exponent is conditioned in a twice shift mode as shown in FIG. 7. When the exponent width EW becomes "0"-"3", the exponent doubles to cause a variation range of the differential data as shown in FIG. 9. When the shift amount DR changes in an extent of "0"-"7", the mantissa is shifted in "1"-"8" bits. For example, the mantissa is shifted to "4" bits when the shift amount DR is "3" as shown in FIG. 11.

Figure 12:
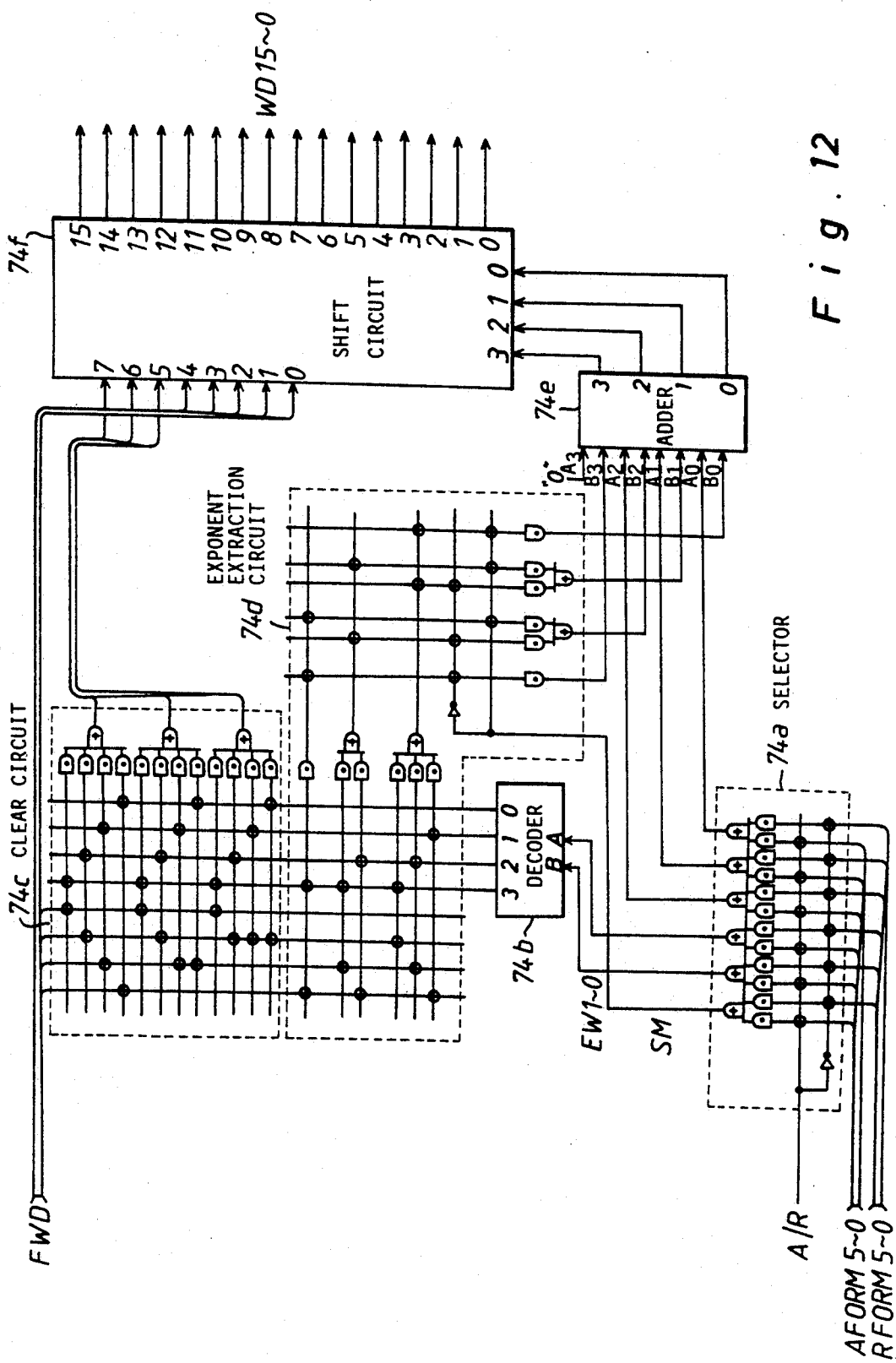
FIG. 12 is a diagram of a linear conversion circuit.
Figure 13:
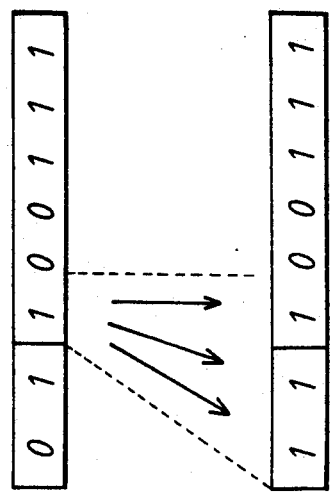
FIG. 13 is a view illustrating operation of the linear conversion circuit.

As shown in FIG. 2, a linear conversion circuit 74 is arranged to be applied with the wave form data read out from the wave form memory 80 in accordance with the address signal AD from the address signal generator 73 for linearly converting the compressed information into an original information. As shown in FIG. 12, the linear conversion circuit 74 has a selector 74a arranged to be applied with the attack part format AFORM and repeat part format RFORM indicative of the compressed information and the discrimination signal A/R for selection of the format AFORM and RFORM. The selector 74a selects the attack part format AFORM when the discrimination signal A/R is "1" and selects the repeat part format RFORM when the discrimination signal A/R is "0". A decoder 74b is connected to the selector 74a to be applied with an exponent width EW of two bits from the compressed information for decoding it into decode values "0"-"3". Output signal lines 0-3 of the decoder 74 are arranged in a clear circuit 74c which copies sign bits of the mantissa on the exponent of the differential data FWD applied from the wave form memory 80 and to retain the sign bits thereon. When the exponent width EW is "10" of two digits, the output signal line 2 of decoder 74b is made "1" to issue the higher fifth bit of the differential data FWD as each data of the higher seventh, sixth and fifth bit data. In this instance, the highermost bit of the mantissa is copied on the higher bit of the exponent to retain the sign bit of the mantissa. For this reason, the clear circuit 74c is applied with the above-described four bits including the sign bit of the mantissa and the higher three bits for the exponent.

The output of decoder 74b is also applied to an exponent extraction circuit 74d which is arranged to extract the exponent of the differential data in accordance with the output of decoder 74b. The exponent extraction circuit 74d is further applied with the shift mode SM shown in FIG. 7 to issue the extracted exponent therefrom when the shift mode SM is "0" and to shift the extracted exponent by one bit to its higher digit when the shift mode is "1". Assuming that the exponent width EW is "10" when the shift mode SM is "0", the mantissa becomes six bits, and the fixed point part itself represents −32 to +31 which are made eight times in a maximum by the exponent to represent an extent of −256 to +248 as shown in FIG. 8. Assuming that the exponent width EW is "10" when the shift mode SM is "1", the mantissa itself also represents −32 to +31 which are made sixty four times in a maximum by the exponent to represent an extent of −2048 to +1984 as shown in FIG. 9. In this embodiment, the output of exponent extraction circuit 74d is made four bits since the exponent is composed of maximum three bits in the twice shift mode.

The output of exponent extraction circuit 74d is applied to B-terminals of an adder 74e to be added to the shift amount DR of the compressed information applied to A-terminals of the adder 74e. The shift amount DR is composed of three bits to shift the fixed point part by "1"-"8" bits to its higher digit in accordance with change of the shift amount DR to "0"-"7". Assuming that the fixed point part is "8" bits when the exponent is "0", an extent of −128 to +127 is represented under no shift of the compressed information but a minimum extent of −256 to +254 and a maximum extent of −32768 to +32512 are represented in relation to the shift amount DR, as shown in FIG. 10. When the shift amount DR is "3", the fixed point part is shifted by four bits to its higher digit as shown in FIG. 11. Since the shift amount DR is three bits, the adder 74e applied at the uppermost digit of its A-terminals with "0". When over flowed, the adder 74e issues a maximum value of four bits.

Figure 14:
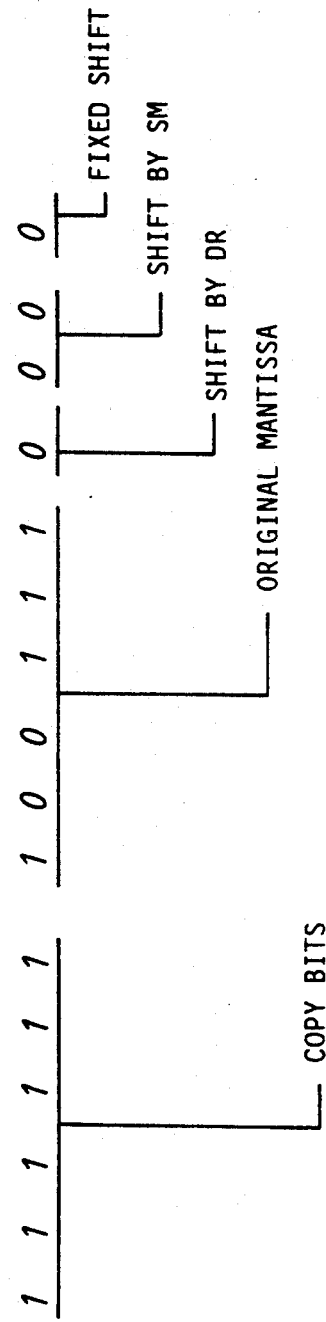
FIG. 14 illustrates a converted condition of a sampling data in the linear conversion circuit.

The resultant of the addition at the adder 74e is applied to a shift circuit 74f which is arranged to shift the differential data cleared at its exponent by a predetermine bit to its higher digit. When the output of four bits of adder 74e changes in an extent of "0"-"7", the shift circuit 74f shifts the mantissa represented by the differential data FWD by "1"-"8" bits to its higher digit to make it a linear differential data WD. In this instance, the highermost bit of the mantissa is copied on a higher blank of the exponent to retain the sign bit. Assuming that the differential data FWD of the exponent is "01100111" and that the compressed information is "XX110001", the exponent is made "01" to represent shift of "1" bit but the shift mode SM is made "1" to represent the twice shift mode. Thus, the shift amount by the exponent is made "2" bits, the shift amount DR is made "001" to represent shift of "1" bit, and shift of "1" bit is added by a deviation of the decode value of adder 74e and the shift bit number of shift circuit 74f. As a result, a total of "4" bits are shifted, the highermost bit "1" or the sign bit of the mantissa is copied on the higher exponent bit, and the same sign bit is copied on the higher four bits to obtain the compressed information as "1111111001110000" as shown in FIG. 14.

The output of shift circuit 74f is applied as a differential data WD to a decoder-accumulator-complement circuit 75 as shown in FIG. 2. When the phase generator 72 issues an address signal AD corresponding with an address I and an address (I+1), differential data WDI and WDI+1 are obtained by the above-described circuits in accordance with the address values. Similarly, the differential data WDI, WDI+1 are separately decoded and accumulated by the decode-accumulator-complement circuit 75 to obtain a wave form data AWDI and AWDI+1. Thus, the wave form data AWDI and AWDI+1 are obtained on a basis of the differential data deviated with one address to one another and are complemented by a fractional part F of the phase amount applied from the phase generator 72 for obtaining a wave form data OWD as precisely as possible. The complement is carried out on a basis of the following equation.

$$OWD = AWDI + (AWDI + 1 - AWDI) \times F$$
$$= (1 - F)AWDI + F \times AWDI + 1$$

After converted into an analogue signal by a D/A converter, the complemented wave form data OWD is applied to a multiplier 76 to be multiplied by a coefficient applied from an envelope generating circuit 77. The envelope generating circuit 77 is applied with various parameters such as the attack level Al, attack rate AR, first decay level D1L, first decay rate D1R, second decay level D2L, second decay rate D2R and key-off rate RR to issue the multiplication coefficient corresponding with the predetermined envelope shown in FIG. 4. The envelope generating circuit 77 is further applied with the key code signal KC and the scaling standard key code STKC to carry out a predetermined scaling in accordance with the key code. The output of multiplier 76 is applied as an output of tone source circuit 70 to the speaker 100 through the sound system 90 to be reproduced as a musical tone.

Hereinafter, the mode of operation of the embodiment will be described in detail. Assuming that the player starts to perform the key board 50 after selecting a desired tone color by operation of the operation panel 60, the CPU 20 initiates execution of the program stored in the ROM 30 to produce various operation signals in accordance with operation of the key board 50. The CPU 20 first produces a tone color signal indicative of the selected tone color and applies it to the tone source circuit 70. When applied with the tone color signal, the interface circuit 71 of tone source circuit 70 reads out a start address from a voice bank of the tone color with reference to the voice directory in the wave form memory 80 and reads out various parameters and a differential data in accordance with the performance operation on a basis of the start address. Assuming that the player depressed either one of the keys on key board 50, the CPU 20 detects the operation of the depressed key to produce a key-on signal KON indicative of the depression of the key and a key code signal KC indicative of the depressed key. When applied with the key-on signal KON and key code signal KC through the interface circuit 71, the phase generator 72 clears a previous phase amount by the key-on signal KON to newly accumulate a phase amount per a unit time corresponding with the key code signal KC and applies an integral part I of the accumulated phase amount to the address signal generator 73. Simultaneously, the interface circuit 71 reads out an offset data corresponding with the key code signal KC with reference to the key bank offset table in the voice bank and reads out various kinds of parameters from a key bank defined by the offset data. Thus, the interface circuit 71 applies a differential data number ASIZE of an attack part and a differential data number RSIZE of a repreat part to the address generator 73, applies the attack part format AFORM and the repeat part format RFORM to the linear conversion circuit 74 and applies the other parameters to the envelope generating circuit 77.

In this instance, the address signal generator 73 is applied with the integral part I of the accumulated phase amount from the phase generator 72 and the differential data numbers ASIZE and RSIZE of the attack and repeat parts from the interface circuit 71 to produce an address signal AD converted from the integral part I of the accumulated phase amount in such a manner that the differential data of the repeat part is repeatedly read out after the differential data of the attack part is read out. When applied with the address signal AD, the offset data is added with the possessory addresses of the various parameters to provide an offset for reading out the differential data, and the differential data of the attack part and repeat part are successively read out from the wave form memory 80 to apply the differential data FWD to the linear conversion circuit 74. Thus, the linear conversion circuit 74 is applied with the differential data FWD from the wave form memory 80 and the attack part format AFORM, the repeat part format RFORM and the discrimination signal A/R.

Since the differential data of the attack part is read out immediately after depression of the key, the discrimination signal A/R becomes "1". Thus, the attack part format AFORM is selected by the selector 74a, and the exponent width EW of the selected compression information is decoded by the decoder 74b so that the sign bit of the mantissa is copied on the exponent of the differential data FWD applied from the wave form memory 80 at the clear circuit 74c. Since the wave form of the attack part excitedly changes, the differential data is inevitably enlarged. Accordingly, the exponent width EW is enlarged in preference to the resolution power. If the exponent width EW is a maximum value "11", the exponent is made three bits so that the higher fourth bit sign of the mantissa is copied on the higher three bits of the differential data FWD to be applied to the shift circuit 74f. In this instance, the higher three bits of the differential data FWD are directly applied to the shift circuit 74f since the lower five bits are always the mantissa.

When applied with the higher three bits of the differential data FWD, the exponent extraction circuit 74d extracts the exponent corresponding with the output of decoder 74b. In this instance, the exponent extraction circuit 74d is further applied with the shift mode SM to shift the exponent by one bit to its higher digit when the shift mode SM is "1" to represent the twice shift mode. When the differential data FWD is inevitably enlarged due to large variation of the wave form, the shift mode SM becomes "1". Normally, the shift mode SM becomes "0" to represent the normal shift mode. Subsequently, the adder 74 adds the extracted exponent to the shift amount DR in the compressed information and applies the resultant of the addition to the shift circuit 74f. Thus, the exponent is cleared by the shift circuit 74f, and the differential data FWD is shifted by a predetermined amount to its higher digit. In this instance, the resultant of the addition will not increase more than "15" even if the shift amount DR is "7" under the twice shift mode.

In the shift circuit 74f, the difference data FWD is shifted by the predetermined amount and copied with the sign bit at its higher blank portion to apply a linear differential data WD to the decoder-accumulator-complement circuit 75. In the decoder-accumulator-complement circuit 75, the linear differential data is decoded and accumulated. In this instance, two wave form data are obtained on the basis of the differential data memorized in the successive addresses of wave form memory 80 by the time-divided processing described above. Thus, the decoder-accumulator-complement circuit 75 carries out complement calculation of the wave form data on a basis of the fractional value F applied from the phase generator. After the complement calculation, the wave form data are converted into analogue signals to be applied to the multiplier 76.

The multiplier 76 is applied with the analogue signals indicative of the wave form data from the decoder-accumulator-complement circuit 75 and a multiplication coefficient from the envelope generator 77. The multiplication coefficient represents a predetermined envelope which is obtained by scaling on the basis of a difference between the key code signal KC and the scaling standard key code STKC, the level scaling data and rate scaling data read out with the offset data and memorized in the initial area of the voice bank in accordance with the attack level AL, attack rate AR, first decay level D1L, first decay rate D1R, second decay level D2L, second decay rate D2R and the key-off rate RR. Thus, the wave form data are applied with the envelope in accordance with the multiplication coefficient and amplified by the sound system to be reproduced as a musical tone from the speaker 100.

When the differential data of the attack part has been read out as described above, the address signal generator 73 discriminates the fact that a read-out address represented by the integral part I of the phase amount applied from the phase generator 72 has exceeded the attack part. Thereafter, the read-out address is appropriately changed in such a manner that the differential data of the repeat part is repeatedly read out in accordance with an increase of the integral part I of the phase amount. Under such control of the address signal generator 73, the differential data of the repeat part is successively read out from the wave form memory 80. In this instance, the wave form of the repeat part does not excitedly change like that of the attack part. Accordingly, the resolution power is made in preference to the variation range of the differential data. In the case that the exponent is made "0" and all the eight bits of the differential data are made the mantissa, data beyond the extent of the mantissa can be shifted by the shift amount DR. In the case that the exponent is made "1" bit, the exponent is cleared at the exponent clear circuit 74c, extracted at the exponent extraction circuit 74d and shifted by the predetermined amount at the shift circuit 74f. After the differential data FWD of the exponent has been converted into the linear differential data Wd at the exponent linear conversion circuit 74, the wave form data as well as the attack part is obtained and applied to the speaker 100 through the sound system 90 to be reproduced as a musical tone.

Although in the above embodiment the digit number of the exponent is memorized in the wave form memory, the digit number of the mantissa may be memorized in the wave form memory. In an application of the present invention, the wave form signal generating apparatus may be adapted not only to a tone source for reproduction of a musical tone signal but also to memorize another wave form. For example, the present invention may be adapted to memorize a tremolo or vibrato wave form and also to a wave form memory for a low frequency oscillator.

Although in the above embodiment the shift mode SM and the shift amount DR ara adapted to shift the exponent of the differential data, the shift mode SM and shift amount DR may be adapted as a data of the exponent. In such a case, the memory capacity can be reduced since the shift amount is memorized separately from the differential data. Although in the above embodiment the differential data is used as a data related to the wave form, an instantaneous sampling data may be used for reproduction of the wave form. In such a case, the accumulator in the embodiment can be eliminated to simplify the circuit arrangement.

What is claimed is:

1. A wave form generating apparatus for storing a desired wave form in a floating point representation for generating a wave form signal based on the stored floating point representation, the apparatus comprising:

an address signal generator for generating an address signal in accordance with an input data applied thereto;

memory means for storing the floating point representation as a single data set including a mantissa and an exponent of sampling data of the desired wave form to form compressed information, said memory means further comprising a digit number memory for storing digit number information indicative of a number of digits of the stored exponent of said sampling data allotted in the predetermined number of digits; and wave form signal generating means for reading out the stored mantissa and exponent of said sampling data in response to the address signal from said address generator for generating a wave form signal based on the read out mantissa and exponent of said sampling data, said wave form signal generating means including extraction means for extracting the memorized exponent based on the digit number information and wave form reproduction means for reproducing the wave form signal based on the extracted exponent and the mantissa allotted in the remaining portion of the predetermined number of digits.

2. A wave form signal generating apparatus as claimed in claim 1, wherein said sampling data is memorized in said memory means as a differential data indicative of a difference in level between adjacent sampling points on the desired wave form.

3. A wave form signal generating apparatus as claimed in claim 1, wherein said wave form reproduction means comprises shift means for shifting the mantissa allotted in a remaining portion of the predetermined number of digits by the extracted exponent for reproduction of the wave form signal.

4. A wave form signal generating apparatus as claimed in claim 1, wherein said memory means further comprises a shift mode memory for memorizing a normal shift mode and a twice shift mode to be selected in accordance with a level of the input data applied to said address signal generator and means associated with said extraction means for making the extracted exponent twice under the twice shift mode.

5. A wave form signal generating apparatus as claimed in claim 1, wherein said memory means further comprises a shift amount memory for memorizing a shift amount to be applied in accordance with a level of the input data applied to said address signal generator and means associated with said extraction means for adding the shift amount to the extracted exponent.

6. A memory for a wave form signal generating device, the memory comprising:

a plurality of voice banks for storing tone color data, each of the plurality of voice banks including a plurality of key banks for storing wave form data, the wave form data consisting of sample points of a wave to be generated, each of the sample points being stored as a single floating point data set having a predetermined number of bits, and the single floating point data set including a mantissa and an exponent, the exponent being composed of high order bits of the predetermined number of bits, and the mantissa being composed of low order bits of the predetermined number of bits;

a voice directory including a plurality of start addresses, each of said plurality of start addresses for providing access to one of said plurality of voice banks; and an address signal generator for generating start address signals for addressing the plurality of voice banks to access the key banks and the single floating point data sets stored therein.

7. The memory of claim 6 further comprising a digit number memory for storing digit number data indicative of a number of the high order bits representing the exponent of each of the data floating point sets.

* * * * *